Feb. 4, 1958

A. P. CURRAN 2,822,230

SERVICE STAND AND TELEPHONE SHELTER

Filed Nov. 23, 1954

INVENTOR.
ARWIN PETE CURRAN,
BY: Harold B. Hood.
ATTORNEY.

United States Patent Office 2,822,230

Patented Feb. 4, 1958

2,822,230

SERVICE STAND AND TELEPHONE SHELTER

Arwin Pete Curran, Indianapolis, Ind.

Application November 23, 1954, Serial No. 470,698

8 Claims. (Cl. 312—323)

This invention relates to a service stand and telephone shelter for use primarily in connection with the invention disclosed in my pending application Serial No. 377,802, filed September 1, 1953 for "Curb-Phone Drive-In System and Method," now abandoned. The invention therein involves the concept of providing a two-way telephone accessible to each stall in a drive-in restaurant whereby a customer can telephone his order to an operator at a central switchboard contiguous to the kitchen. The parking areas in such establishments are open to the weather and it is desirable to provide a protective, relatively weather-tight shelter for the telephone at each stall. The primary object of my invention is, therefore, to provide such a shelter which is relatively inexpensive to manufacture but which will provide the required protection against the elements.

Certain types of customers patronizing the drive-in type restaurants are noted for their mischievous tendencies leaning, at times, toward sheer vandalism. A device such as here under consideration presents quite a challenge to such individuals. It is, therefore, a further object of the invention to provide a structure which will be as near vandal-proof as possible and, to this end, to provide hinge means for the door, through which access is had to the telephone therein, of such a construction as to be completely protected against interference from outside sources.

In such establishments, orders are usually delivered to the patron upon trays which are attached to the door of the automobile and which remain there until the patron is ready to leave. In some instances, however, such trays remain attached to the automobile door after the patron departs, resulting in a considerable monetary loss to the establishments since such trays are relatively expensive. The loss through tray theft in such a restaurant is surprisingly high. Another object, therefore, is to provide a telephone shelter which includes, as an integral part, a tray surface adjacent the shelter upon which the order can be placed, thereby eliminating the practice of leaving the serving tray with the customer.

Ancillary objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figures 1, 2, 3:
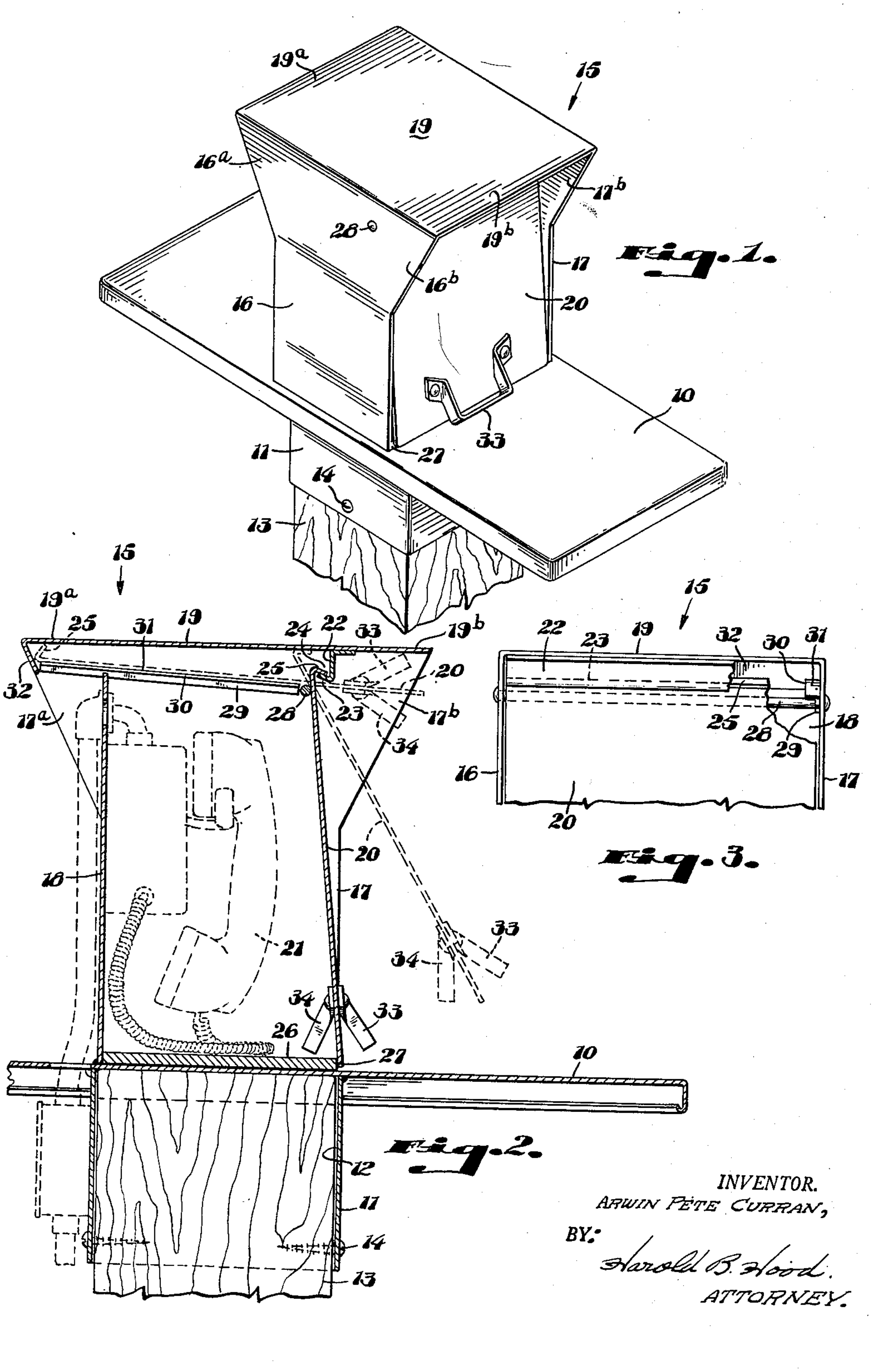
Fig. 1 is a perspective view of my shelter and service stand showing the manner in which it is intended primarily for use.
Fig. 2 is a longitudinal sectional view through the structure of Fig. 1 showing certain details of construction thereof.
Fig. 3 is a partial front elevation looking from the right of Fig. 2, parts being broken away for clarity of illustration.

Referring more particularly to the drawings, it will be seen that my device comprises a substantially horizontal platform 10 having a thimble 11 fixed to the under surface thereof to provide a downwardly-opening socket 12 for telescopic reception of the upper end of a base post 13. Screws 14, or the like, can be used for fixing the platform to such post.

The telephone shelter, referred to generally by the reference numeral 15, comprises side walls 16 and 17, a rear wall 18 and a top wall 19 forming a box-like structure having a front wall or door 20 providing access to the interior of such structure. A telephone 21 of conventional construction is located on the interior of the box for the purpose heretofore mentioned.

Door 20 is supported from the top wall 19 upon a plate 22 depending therefrom and having its lower edge 23 turned toward rear wall 18 and slightly upward toward top wall 19 to provide a channel 24 opening toward the interior of box 15. The upper edge of door 20 is turned away from rear wall 18 and slightly downward to provide a hook 25 releasably engageable in channel 24. In its closed position, door 20 will hang in a near-vertical position from the plate 22 and in order to maintain the door in such closed position without the need of any type of locking means, I prefer to provide a floor plate 26 for box 15 having an edge 27 spanning the side walls 16 and 17. The plate 22 is spaced slightly toward the interior of box 15 so that in its closed position door 20 will overlap the edge 27 and be inclined slightly toward the interior of said box to permit the weight of the door to hold it solidly against the edge of the floor plate 26.

The use to which this structure is intended primarily to be put requires that the height of the box be substantially greater than the depth between the rear wall 18 and the door 20. In operation, door 20 is intended to be swung out of its near-vertical, closed position, as illustrated in solid lines in Fig. 2, and into a near-horizontal, open position and then be slid into a storage position beneath the top wall 19, as illustrated in dotted lines in Fig. 2. I have found it necessary, therefore, to make the length of top wall 19 substantially equal to the height of the door 20 in order to afford protection for said door when in its storage position. This results in a substantial overhang of top wall 19 beyond the rear wall 18 and the front wall 20, such overhangs serving the additional function of providing weather eaves **19*a* and 19*b***.

Adjacent the inner surface of door 20 and spaced slightly downward from the channel 24, I provide fulcrum means, here shown in the form of a rod 28 spanning the side walls 16 and 17. The door pivots about such fulcrum in being moved from its closed to its open position. Within box 15 I provide a supporting surface 31 for door 20 when in its storage position. Such surface is formed by means of a pair of angle brackets 29 oppositely supported on the interior of walls 16 and 17 and each having a lip 30 projecting toward the lip of the opposite bracket. These brackets lie substantially in a plane including the rod 28 and are inclined therefrom slightly upward toward rear wall 18. Rear wall 18 terminates just below surface 31 to permit the upper edge of the door 20 to pass over said rear wall.

Gussets **16*a*, 16*b* and 17*a*, 17*b* are provided by side walls 16 and 17 respectively for supporting the overhangs of top wall 19 and to serve as additional protection against rain, and the like. A flap 32 is supported on the rear edge of top wall 19 and intersects the plane of supporting surface 31. Such flap serves as protection against the weather entering through the space above rear wall 18 and, in addition, acts as a stop for the door 20** as it is moved into its storage position.

I provide a handle 33 near the lower edge of door 20 and it will be noted that, when said door is in its storage position, such handle becomes inaccessible upon being moved beneath the overhang **19*b*. I therefore provide a further handle 34, similarly fixed to the interior surface of door 20**, which becomes accessible when the door is in its storage position.

It will be seen that the platform 10 extends substantially beyond the boundaries of box 15 to provide tray surfaces adjacent the box upon which the customer's order is placed. Thus a compact, relatively inexpensive and trouble-free structure is provided by the use of my invention completely eliminating the need of the more expensive trays now used for serving the customer's order in his automobile.

I claim as my invention:

1. In a device of the class described, a box having a substantially rectangular aperture in one side thereof, a door for said aperture, means providing a supporting surface for said door within said box, and means for supporting said door for swinging movement about the upper edge thereof between a near-vertical, closed position and a near-horizontal, open position, and for sliding movement of said door onto said supporting surface after movment to said near-horizontal position, said means comprising hook means provided along the upper edge of said door and on the outer surface thereof, channel means supported from said box near the upper edge of said aperture and opening toward the interior of said box, said hook means being releasably engageable in said channel means for supporting said door therefrom when in its closed position, and fulcrum means supported from said box in contact with the inner surface of said door along a line substantially parallel to said channel means but spaced downwardly therefrom a distance slightly greater than the thickness of said door, said supporting surface lying substantially in a near-horizontal plane including the line of said fulcrum means.

2. In a device of the class described, a box comprising a substantially horizontal base, side walls and a rear wall upstanding from said base, a top wall, a front wall, and means supporting said front wall for swinging movement of said wall about the upper edge thereof between a near-vertical, closed position and a near-horizontal, open position, and for sliding movement of said front wall, after movement to said near-horizontal position, to move said upper edge toward the rear wall of said box, said means comprising a plate substantially parallel to said rear wall and depending from said top wall with the lower edge thereof turned toward said rear wall and slightly upward toward said top wall to provide a channel, the upper edge of said front wall being turned away from said rear wall and slightly downward toward said base to provide a hook engageable in said channel when said front wall is in its closed position, a rod spanning said side walls and engaging the inner surface of said front wall along a line spaced slightly below said channel, and means supported within said box and providing a supporting surface for said front wall when said wall is in its open position, said surface lying in a near-horizontal plane including said rod and extending therefrom toward said rear wall.

3. The device of claim 2 including a floor plate providing an edge upstanding from said base and spanning said side walls, said rod and said plate providing said channel being spaced slightly from a vertical plane including said edge of said floor plate toward said rear wall to support said front wall, when in its closed position, in a position inclined slightly from said vertical plane toward the interior of said box with the lower edge of said front wall overlapping said edge of said floor plate, the weight of said door holding said lower edge solidly against the edge of said floor plate.

4. The device of claim 2 in which said top wall extends substantially beyond said front wall to provide an overhanging eave for said front wall, said front wall being provided with a pair of handle means, one being fixed upon the outer surface of said front wall near the lower edge thereof and the other being oppositely fixed upon the inner surface of said front wall, said one handle means being moved beneath said overhanging eave when said front wall is moved onto said supporting surface.

5. In a device of the class described, a box having a height substantially greater than the depth thereof and comprising a substantially horizontal base, side walls and a rear wall upstanding from said base, a front wall, a top wall having a length substantially equal to the height of said box permitting said top wall to overhang said rear and front walls thereof, and means supporting said front wall on said box for swinging movement about the upper edge thereof between a near-vertical, closed position and a near-horizontal, open position, and for sliding movement, after movement to said near-horizontal position, into a storage position beneath said top wall, such means comprising a plate depending from said top wall with the lower edge thereof turned toward said rear wall and slightly upward toward said top wall to provide a channel, the upper edge of said front wall being turned away from said rear wall and slightly downward to provide a hook releasably engageable in said channel to support said front wall therefrom in said closed position, means supported on said side walls and providing a fulcrum engaging the inner surface of said front wall along a line substantially parallel to said channel but spaced slightly downwardly therefrom, means providing a supporting surface for said front wall when in its storage position, said surface lying substantially in a plane including the line of said fulcrum and inclined slightly upwardly therefrom toward said rear wall, and a flap depending from the rear edge of said top wall and intersecting the plane of said supporting surface, said rear wall terminating below said supporting surface to permit the upper edge of said front wall to pass above said rear wall and move into arresting engagement with said flap.

6. The device of claim 5 including a floor plate for said box providing an edge upstanding from said base and spanning said side walls, said channel-providing plate being spaced slightly toward said rear wall from a vertical plane including said edge of said floor plate to support said front wall, when in its closed position, in a position inclined slightly away from said vertical plane, the lower edge of said front wall overlying said floor plate edge and being held solidly thereagainst by the weight of said front wall.

7. The device of claim 5 in which said fulcrum means comprises a rod spanning said side walls, and said means providing said supporting surface comprises a pair of brackets fixed to said side walls and each providing a lip projecting toward the lip of the other bracket.

8. The device of claim 5 in which said front wall is provided with a pair of handles, one being fixed upon the outer surface of said wall near the lower edge thereof and the other being oppositely fixed upon the inner surface of said wall, said one handle becoming inaccessible beneath said top wall when said front wall is moved to its storage position.

References Cited in the file of this patent

UNITED STATES PATENTS

| | | |
|---|---|---|
| 324,419 | Shuler | Aug. 18, 1885 |
| 492,909 | Watts | Mar. 7, 1893 |
| 804,487 | Macarthy | Nov. 14, 1905 |
| 1,679,791 | Silberhartz | Aug. 7, 1928 |
| 2,241,884 | Noble | May 13, 1941 |
| 2,590,028 | Miller | Mar. 18, 1952 |